United States Patent [19]

Jeong

[11] Patent Number: 5,235,650
[45] Date of Patent: Aug. 10, 1993

[54] PATTERN CLASSIFIER FOR CHARACTER RECOGNITION

[75] Inventor: Ho-sun Jeong, Taegu, Rep. of Korea

[73] Assignee: Samsung Electronics Co. Ltd., Kyunggi-do, Rep. of Korea

[21] Appl. No.: 833,121

[22] Filed: Feb. 10, 1992

Related U.S. Application Data

[63] Continuation-in-part of Ser. No. 751,613, Aug. 21, 1991, abandoned, which is a continuation of Ser. No. 473,464, Feb. 1, 1990, abandoned.

[30] Foreign Application Priority Data

Feb. 2, 1989 [KR] Rep. of Korea ............ 89-1371

[51] Int. Cl.⁵ .............................................. G06K 9/00
[52] U.S. Cl. ................................ 382/36; 382/14; 382/35
[58] Field of Search ................. 382/33, 35, 14, 15, 382/36; 395/24

[56] References Cited

U.S. PATENT DOCUMENTS

| | | | |
|---|---|---|---|
| 3,104,369 | 11/1963 | Rabinow | 382/35 |
| 3,142,824 | 7/1964 | Hill | 382/35 |
| 3,167,745 | 1/1965 | Bryan | 382/35 |
| 4,914,708 | 4/1990 | Carpenter | 382/14 |

Primary Examiner—Michael T. Razavi
Assistant Examiner—Yon Jung
Attorney, Agent, or Firm—Cushman, Darby & Cushman

[57] ABSTRACT

A pattern classifier for character recognition is constructed in accordance with a neural network model. The pattern classifier comprises $(2n+1)\times(2n+1)$ input buffer amplifiers and m output buffer amplifiers. The input buffer amplifiers have an inverted output line and a non-inverted output line which intersect input lines to the output buffers. Synapses are selectively arranged at the intersections of the output and input lines in accordance with predetermined mask patterns used in character recognition. PMOS and NMOS transistors are employed for the synapses.

4 Claims, 14 Drawing Sheets

PATTERN CLASSIFIER FOR CHARACTER RECOGNITION

CROSS-REFERENCED TO RELATED APPLICATIONS

This application is a continuation-in-part of U.S. application Ser. No. 07/751,613, filed on Aug. 21, 1991, now abandoned which is a file wrapper continuation of U.S. application Ser. No. 07/473,464, filed on Feb. 1, 1990 now abandoned.

FIELD OF THE INVENTION

The present invention relates to a pattern classifier for character recognition, and particularly to a pattern classifier for character recognition using the neural network for real time processing.

BACKGROUND OF THE INVENTION

Research for character and mark recognition started with the optical character system (OCR) developed in the 1960's, which can recognize certain characters (mainly, numbers and the English alphabet). Then, the development of sensors and recognition algorithms has enabled recognition of ordinary print Alphabet. Recently, the research for script recognition is in progress.

Most known techniques for character recognition depend on software. However, since these character recognition techniques have limited speed, hardware recognition techniques are preferred to overcome these software limitations.

Figure 1:
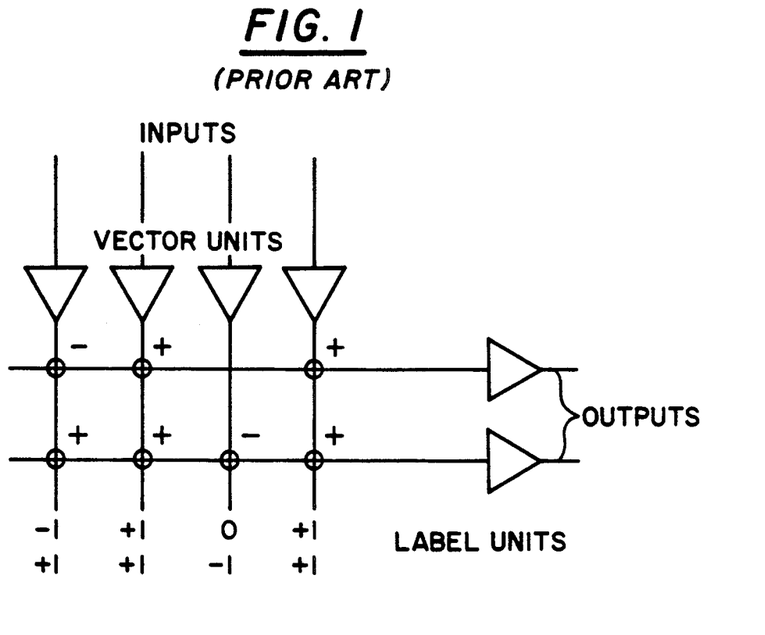
FIG. 1 is a configuration diagram of a pattern classifier in the prior art.

In 1988, Bell Laboratories of AT & T company published the possibility of the implementation of VLSI in neural networks by means of the pattern classifier using a neural cell model as shown in FIG. 1 (H. P. Graf, L. D. Iackel, and W. E. Hubbard; VLSI Implementation of a Neural Network Model, IEEE Trans. computer: PP. 41–49 March 1988).

In FIG. 1, the pattern classifier has two groups of amplifiers: label units and vector units. A number of vectors are stored in the circuit and each stored vector is connected to an input of one label unit. The components of the stored vectors can have a value of $-1$, 0 or $+1$. An excitatory connection is set for a value of $+1$ and an inhibitory connection for a value of $-1$. An input vector is applied to the input of the vector unit. The components of the input vector have values of $+1$ or 0. Whenever a value of $+1$ is input, current can be added to or subtracted from the input of the label unit depending upon the stored vector (i.e., the type of connections). In this circuit, a stable state condition occurs when the total current flowing into an input line equals 0. If the input voltage is above the threshold voltage of the amplifier, the output of the label unit becomes "High"; otherwise, the output remains "Low". The output of a label unit is determined by the following equation 1.

$$\sum_{i=0}^{i=N} \frac{\delta i \cdot \mu i}{Ri} \begin{cases} >0: V_{out} = \text{"High"} \\ <0: V_{out} = \text{"Low"} \end{cases} \quad (1)$$

where $\simeq$ denotes components of the input vector, which has a value of $+1$ or 0;

$\mu$ denotes components of the stored vector, which has a value of $-1$, 0 or $+1$; and Ri is the connecting resistance, which has a value of $R-$ or $R+$.

The input vector is compared in parallel with all stored vectors and an inner product between the input vector and the stored vectors is evaluated. A value of $+1$ in the input vector at the position of a value of $+1$ in the stored vector gives a positive contribution to the sum of inner product, while a value of $+1$ in the input vector at the position of a value of $-1$ in the stored vector gives a negative contribution to the sum of the inner product.

The output of label units corresponding to all the stored vectors closely resembling the input vector is "High".

In this circuit, if the connecting resistance $R+$ is made larger than $R-$, the inner product of a mismatch (a value of $+1$ in the position of a stored value of $-1$) is comparatively larger than the inner product of match.

Therefore, if an input value of $+1$ is set in the position of stored value $+1$, the input vector can be erroneously seen to mismatch the stored vector.

On the other hand, another problem exists in that the label units may output a match irrespective of the stored vector. Namely, as shown in FIG. 1, assuming that $(-1, +1, 0, -1)$ and $(+1, +1, -1, +1)$ are stored in the stored vector, when the input vector of $(0, +1, 0, 0)$ is input, both label units output a match or "High" state.

SUMMARY OF THE INVENTION

It is an object of the present invention to provide a pattern classifier for character recognition using the neural network model of the single layer perceptron type in order to overcome the conventional problems mentioned above.

It is another object of the present invention to provide a pattern classifier for character recognition for real time processing.

It is another object of the present invention to provide the pattern classifier for the character recognition which facilitates VLSI implementation.

To achieve the above objects, the present invention is characterized by comprising:

a plurality of masks which are composed of a $(2n+1)\times(2n+1)$ pixel region, where $n=1, 2, 3 \ldots$ having a character region, a back ground region and a don't care region and which are composed of a series of mutually different character region patterns.

$(2n+1)\times(2n+1)$ input buffer amplifiers for outputting an inversion and non-inversion value of the pixel value corresponding to each pixel of the $(2n+1)\times(2n+1)$ pixel region;

a plurality of output buffer amplifiers having in number as many as said plural masks;

character pattern synapses for combining pixel values allotted in the character region of the mask respectively corresponding to the output buffer amplifier at the cross-section of the inversion output lines of said input buffer amplifiers and the input lines of said output buffer amplifiers;

background pattern synapses for combining pixel values allotted in the character region of the mask respectively corresponding to said output buffer amplifier at the cross-section of the non-inversion output lines of said input buffer amplifiers and the input lines of said output buffer amplifiers; and bias synapses for making the output of amplifier "High" only for the game input as the mask pattern corresponding to the input lines of the output amplifiers.

The character pattern synapse is made of a PMOS transistor and the background pattern synapse is made of an NMOS transistor.

A character pattern synapse and a sub-pattern synapse is established as a geometrical aspect ratio W/L so that these conductance values become 1:1. The geometric parameter W/L, which is the ratio of the channel width W to the length L of the MOS transistor, specifies the conductance.

The bias synapse is made of an NMOS transistor and the conductance value has the number value of the PMOS transistor in the character pattern synapse.

These objects of the present invention will become more readily apparent in the following description of the drawings.

DESCRIPTION OF THE PREFERRED EMBODIMENT

Figure 2:
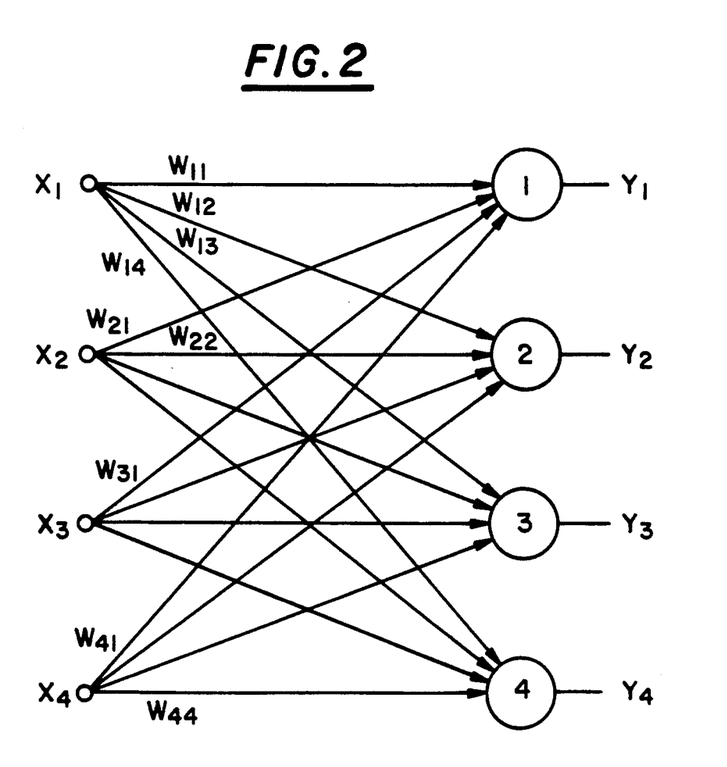
FIG. 2 is a concept diagram of a neural network model of a single layer perceptron type.

The pattern classifier of the present invention employs the neural network model of the single layer perceptron type. As the model proposed by Rosen blatt in 1969, the perceptron has the connecting structure between the nodes as shown in FIG. 2.

The main function of the perceptron is pattern classification by distinguishing the input patterns. The processing circuits of character recognition may be constructed using this algorithm of the single layer perceptron.

Figure 3A:
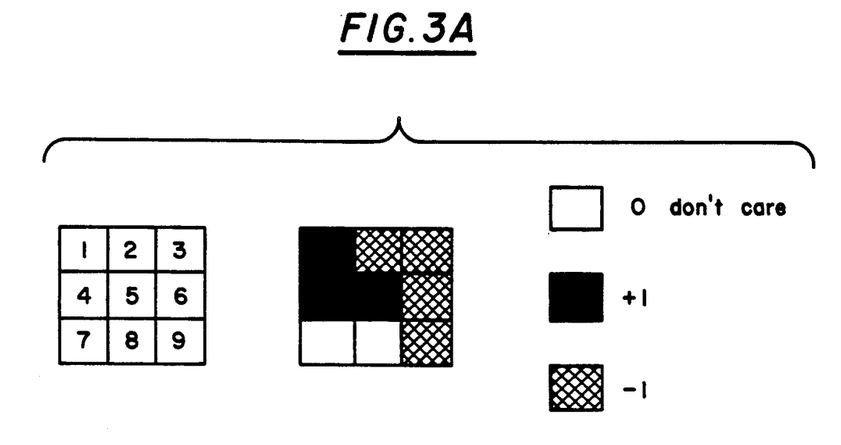
FIG. 3A is a mask pattern diagram for explaining a pattern classifier for the character recognition using a neural network model of a single layer perceptron type.
Figure 3B:
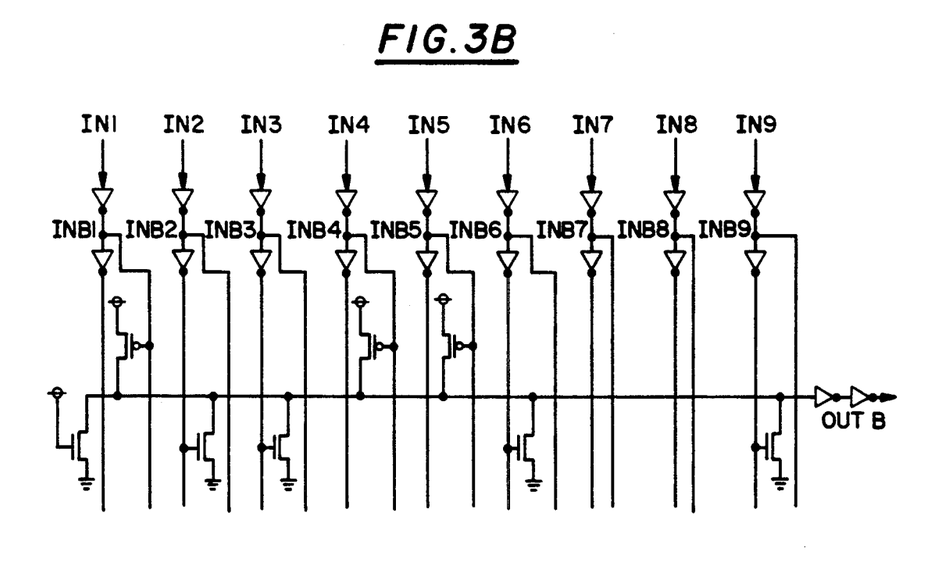
FIG. 3B is a circuit diagram of a pattern classifier for reading the pattern in the present invention.

FIG. 3A is a mask pattern diagram for explaining the basic construction of a pattern classifier for character recognition, and FIG. 3B is a circuit diagram of a pattern classifier which reads the pattern in. In FIG. 3A, the mask has the 3×3 pixel region and each pixel is numbered from 1 to 9. The 3×3 mask pattern is defined to be a value of +1 in a character region, a value of −1 in a background region and a value of 0 in a don't care region. To construct this with CMOS circuitry, a PMOS transistor connection has a value of +1, an NMOS transistor connection has value of −1 and an unconnected intersection has a value of 0.

In FIG. 3B, a circuit diagram of the pattern classifier comprises input buffer amplifiers INB1 to INB9 corresponding to each pixel of the mask in FIG. 3A and an output buffer amplifier OUTB. The input buffer amplifiers INB1 to INB9 are composed of two serially connected CMOS inverters. The output of the prior pixel of the CMOS inverter is inverted and the output of the posterior pixel of the CMOS inverter is not inverted.

The output buffer amplifier OUTB is also composed of two serially connected CMOS inverters.

The PMOS transistors are coupled at the intersections of the inversion output lines of the input buffer amplifiers INB1, INB4 and INB5 and the input line of the output buffer amplifier OUTB. These locations correspond to the pixel locations having a value of +1 in the mask of FIG. 3A. Accordingly, the PMOS transistors of the pattern classifier circuit account for the character region of the mask. The PMOS transistors have a source electrode coupled to a first power source voltage Vdd, a gate electrode coupled to the inversion output line of the input buffer amplifier, and a drain electrode coupled to the input line of the output buffer amplifier OUTB.

The NMOS transistors, which represent the background pattern synapses, are combined at the intersection of the non-inversion output lines of the input buffer amplifiers INB2, INB3, INB6 and INB9 and the input line of the output buffer amplifier OUTB. These locations correspond to the pixel locations having a value of −1 in the mask shown in FIG. 3A, and thus account for the background regions. The NMOS transistors have a source electrode coupled to a second power source voltage of ground voltage, a gate electrode coupled to the non-inversion output line of the input buffer amplifier and a drain electrode coupled to the input line of the output buffer amplifier OUTB.

The intersection corresponding to the don't care region of the mask remains unconnected.

The input line of the output buffer amplifier OUTB is connected to an NMOS transistor (the bias synapse) so that the output of the output buffer amplifier OUTB becomes "High" only when the input matches the mask pattern. The NMOS transistor has a source electrode coupled to the second power source voltage GND, a gate electrode coupled to the first power source voltage Vdd and a drain electrode coupled to the input line of the output buffer amplifier OUTB.

The geometrical aspect ratio W/L of the PMOS transistor (i.e., the character pattern synapse) is 6 $\mu$m/2 $\mu$m so that the conductance value is 1 and the geometrical aspect ratio W/L of the NMOS transistor (i.e., the background pattern synapse) is 2 $\mu$m/2 $\mu$m so that the conductance value is 1. Hence, the conductance values are equal when the ratio W/L of the PMOS transistor is constructed three times the ratio W/L of the NMOS transistor. This relationship occurs because the PMOS carrier is a hole and the NMOS carrier is an electron and electron mobility of 580 cm²/v-sec is approximately three times the hole mobility of 200 cm²/v-sec.

The geometrical aspect ratio W/L of NMOS transistor (i.e., the bias synapse) has a value (2·N) μm/2 μm where N denotes the number of PMOS transistor connected to the input line of the output buffer amplifier OUTB.

If the nine inputs of the pattern classifier are identical with the mask, the output of the output buffer amplifier OUTB remains "High", and if any one of the nine inputs is different, the output remains "Low".

Hence, in case of the same pattern as the mask, all PMOS transistors turn on by the (100110000) input vector and the first power source voltage $V_{dd}$ is applied to the input line of the output buffer amplifier OUTB so that the total sum of the conductance value becomes 3.

At this time, all NMOS transistors of the background pattern synapses remain off; but, the NMOS transistor (i.e., the bias synapse) is always on so that the second power source voltage GND is applied in the conductance value of 3 (i.e., N=three PMOS transistors, and thus (2·3) μm/2 μm=3), and the conductance value of PMOS:NMOS applied to the input line is the same as 3:3.

However, in the identical case, because the geometrical aspect ratio W/L of MOS transistor is designed in the ratio of 6/2:2/2 to be superior in the conductance value of PMOS transistor due to the mobility values (i.e., three times 200 cm²/v-sec is slightly larger than 580 cm₂/v-sec), the output of the output buffer amplifier OUTB becomes "High".

If the mask and the pattern are different, for example, if one or more of the three PMOS transistors turn off or if one or more of the NMOS transistors turn on, thereby causing the total sum of the conductance values of the NMOS transistors to be larger than the total sum of the conductance values of the PMOS transistors, the output of the output buffer amplifier OUTB becomes "Low".

All processing which takes considerable time, i.e., the processes of noise elimination, thinning and feature points such as terminal point, branch point and edge point, may be constructed by the pattern classifier of the present invention which employs the above described principles of character recognition, as discussed below with reference to FIGS. 6-10.

Figure 4:
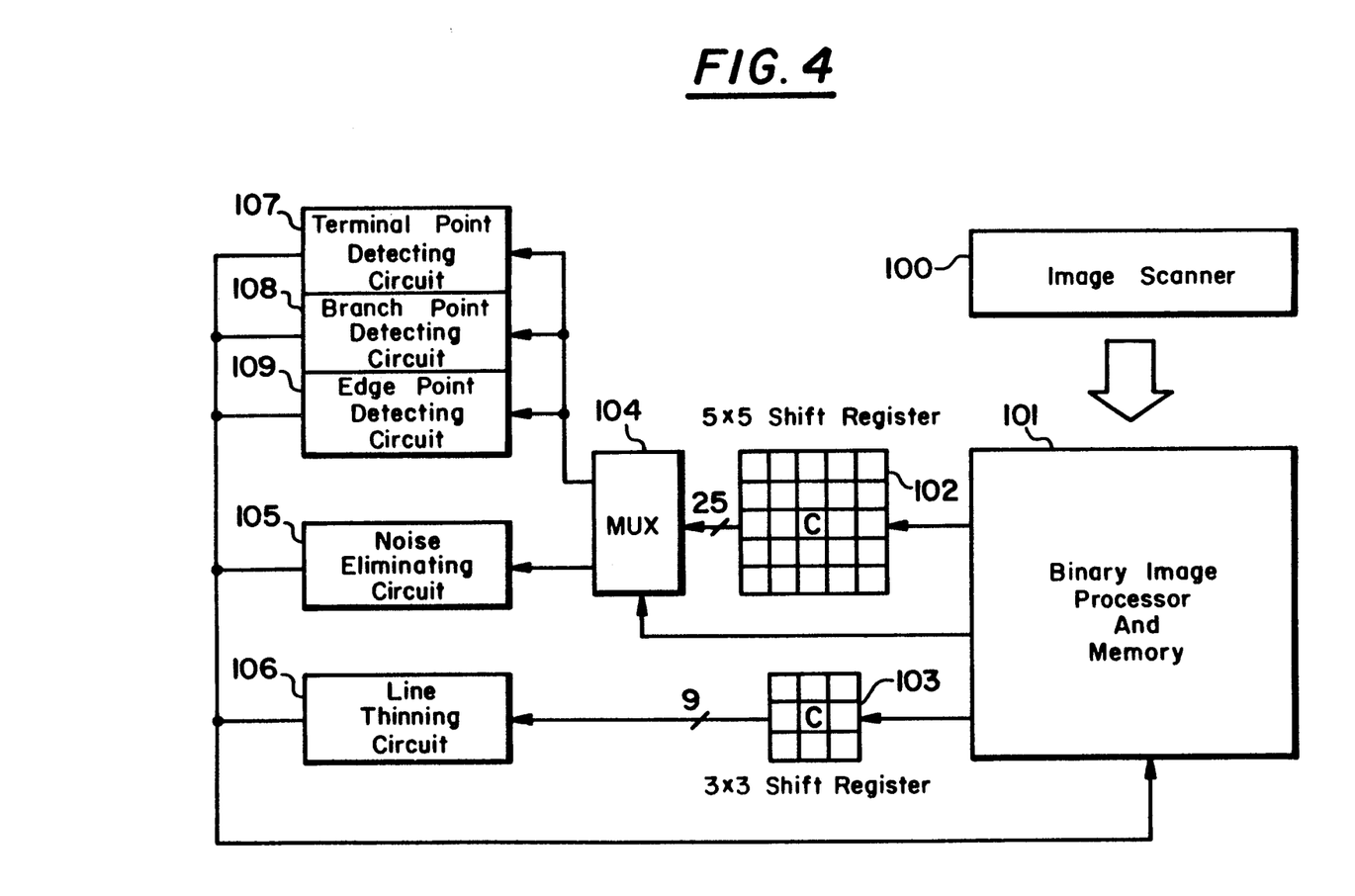
FIG. 4 is a block diagram of a pattern recognition system according to the present invention.
Figure 5A:
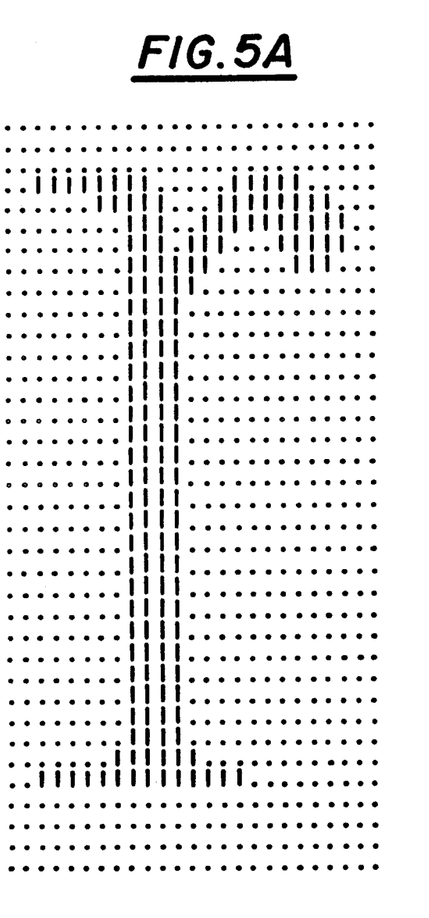
FIGS. 5A-5C respectively show binary image data of an inputted character "r", a thinned character "r", and a character "r" indicated with feature points.
Figure 5B:
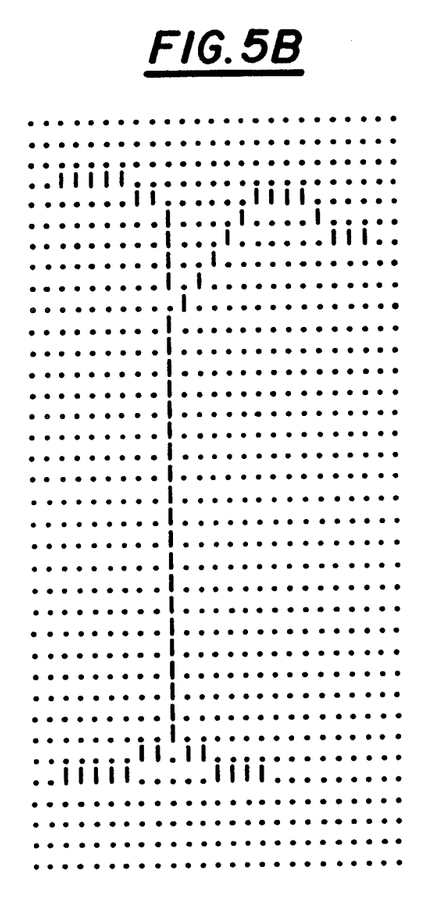
Figure 5C:
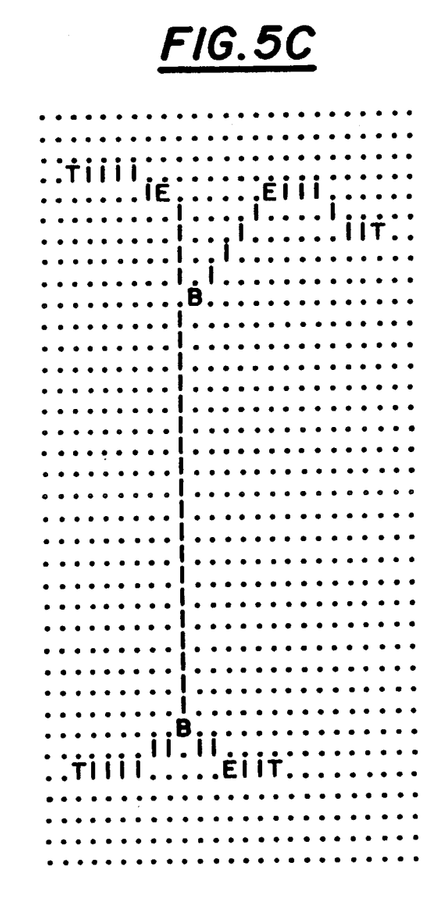

FIG. 4 is a block diagram of a pattern recognition system according to the present invention FIG. 5A is binary image data of an inputted character "r". FIG. B is binary image data of line thinned character "r". FIG. 5C is binary image data of a character "r" indicated with the feature points.

A character image through an image scanner 100 becomes a binary image in a binary image processor and memory 101, and is separated into individual characters, and then memorized in the memory 101.

The memorized binary image data (for example, as shown in FIG. 5A) are successively supplied to a central pixel value (indicate by "C" in FIG. 4) and peripheral pixel values of a 5×5 shift register 102. Each pixel value supplied to the 5×5 shift register 102 is supplied as 25 bit parallel data to a noise eliminating circuit 105 through a multiplexer 104. If the 25 bit parallel data correspond to a pattern of a noise eliminating mask shown in FIG. 6A, the character image corresponding to a central pixel C of the 5×5 shift register 102 is changed from "1" to "0" in the binary image processor and memory 101 so as to remove noise components. On the other hand, if the 25 bit parallel data do not correspond to the pattern of a noise eliminating mask of FIG. 6A and the character image corresponding to the central pixel is "0", the "0" is replaced with a "1" in order to fill lost data. In this way, the noise eliminating process is carried out for all pixels of a character image of each individual character. The noise eliminating circuit 105 will be described in image more detail below with respect to FIG. 6B.

After the noise eliminating processes, the character image has a thick line width in the character region as shown in FIG. 5A. Thus, it is difficult to extract the feature points from the thick line width of the character region. Therefore, it is desired to thin the line into a width of one pixel.

Figure 7A:
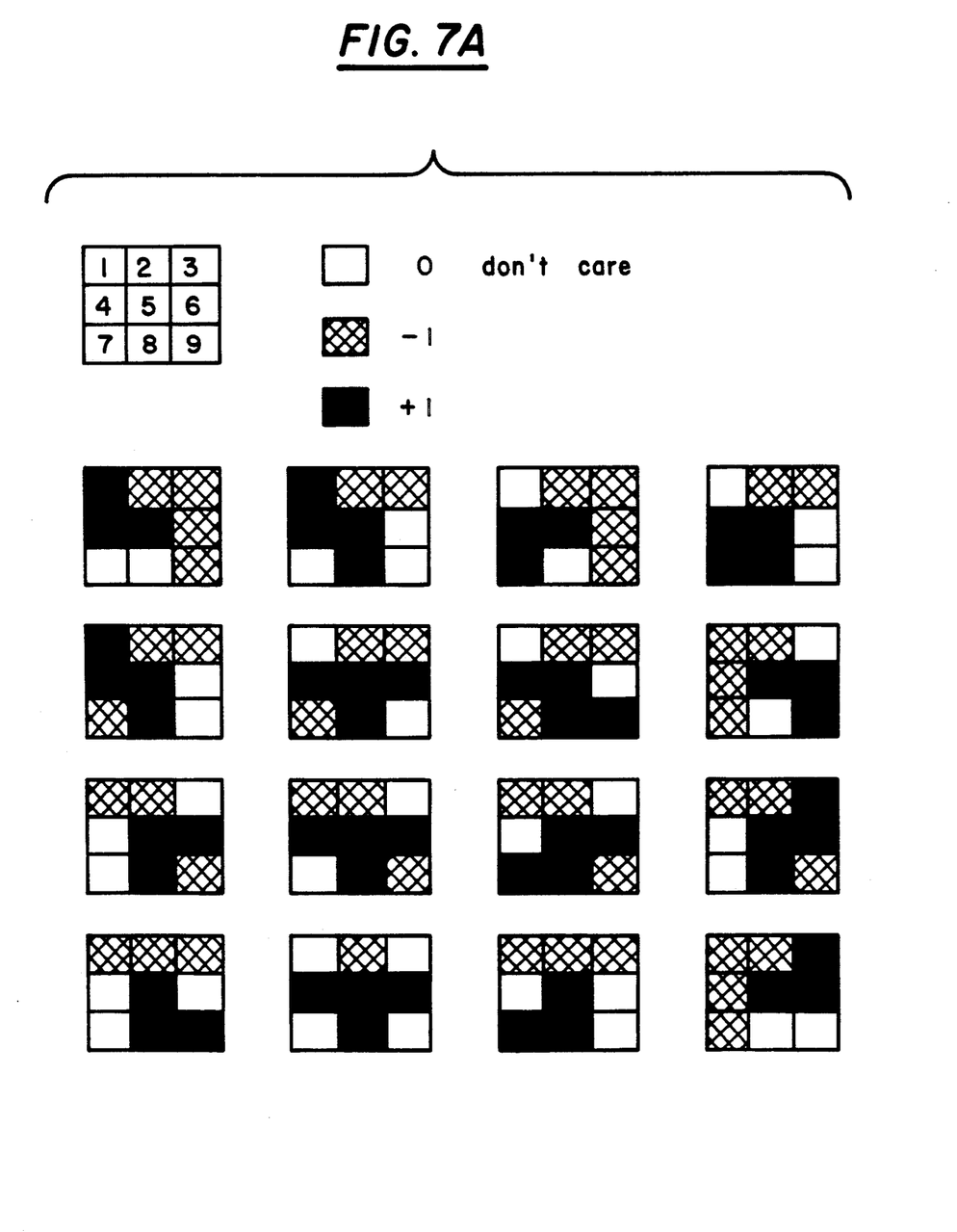
FIG. 7A is a mask pattern diagram for thinning in the character recognition.

Accordingly, when the noise eliminating processes are completed, the binary image processor and memory 101 successively supplies the data of the character image in which noise has been removed, to a 3×3 shift register 103. The data supplied to the 3×3 shift register 103 are supplied as 9 bit parallel data to a line thinning circuit 106. If the 9 bit parallel data are for a mask pattern of a north boundary point, as shown in FIG. 7A, or if the 9 bit parallel data are for a mask pattern of a south, an east, or a west boundary point, which are respectively obtained by rotating the north boundary point mask pattern of FIG. 7A by different multiples of 90 degrees, the binary image processor and memory 101 eliminates a character image corresponding to a central pixel of the 3×3 mask pattern and then carries out the line thinning process. As a result, the line thinned data of the character "r" are obtained as shown in FIG. 5B. The line thinning circuit 106 will be explained in more detail below with reference to FIG. 7B.

When the line thinning process is completed in the binary pixel processor and memory 101, the line thinned character image data are successively supplied to the 5×5 shift register 102. The 25 bit parallel data supplied to the 5×5 shift register 102 are supplied to feature points detecting circuits 107 to 109 through the multiplexer 104. The feature points are a terminal point, a branch point, and an edge point. If the 25 bit parallel data correspond to the mask patterns of FIGS. 8A, 9A and 10A, which are patterned respectively in the feature points detecting circuits 107 to 109, the character image corresponding to a central pixel of the 5×5 mask pattern is replaced with T, B or E in the binary pixel processor and memory 101, so as to detect the respective terminal, branch and edge points for the character "r" indicated in FIG. 5C. The feature point detecting circuits 107 to 109 will be explained in more detail below with reference to FIGS. 8B to 10B.

In the character recognition system according to the present invention, the circuit for eliminating noise, thinning line, detecting feature points, etc. comprises PMOS and NMOS transistors based on the concept of the neural networks as discussed with reference to FIGS. 3A and 3B.

Next, a more detailed explanation of the pattern classifier circuits of the present invention follows with reference to FIGS. 6A to 10B.

Figure 6A:
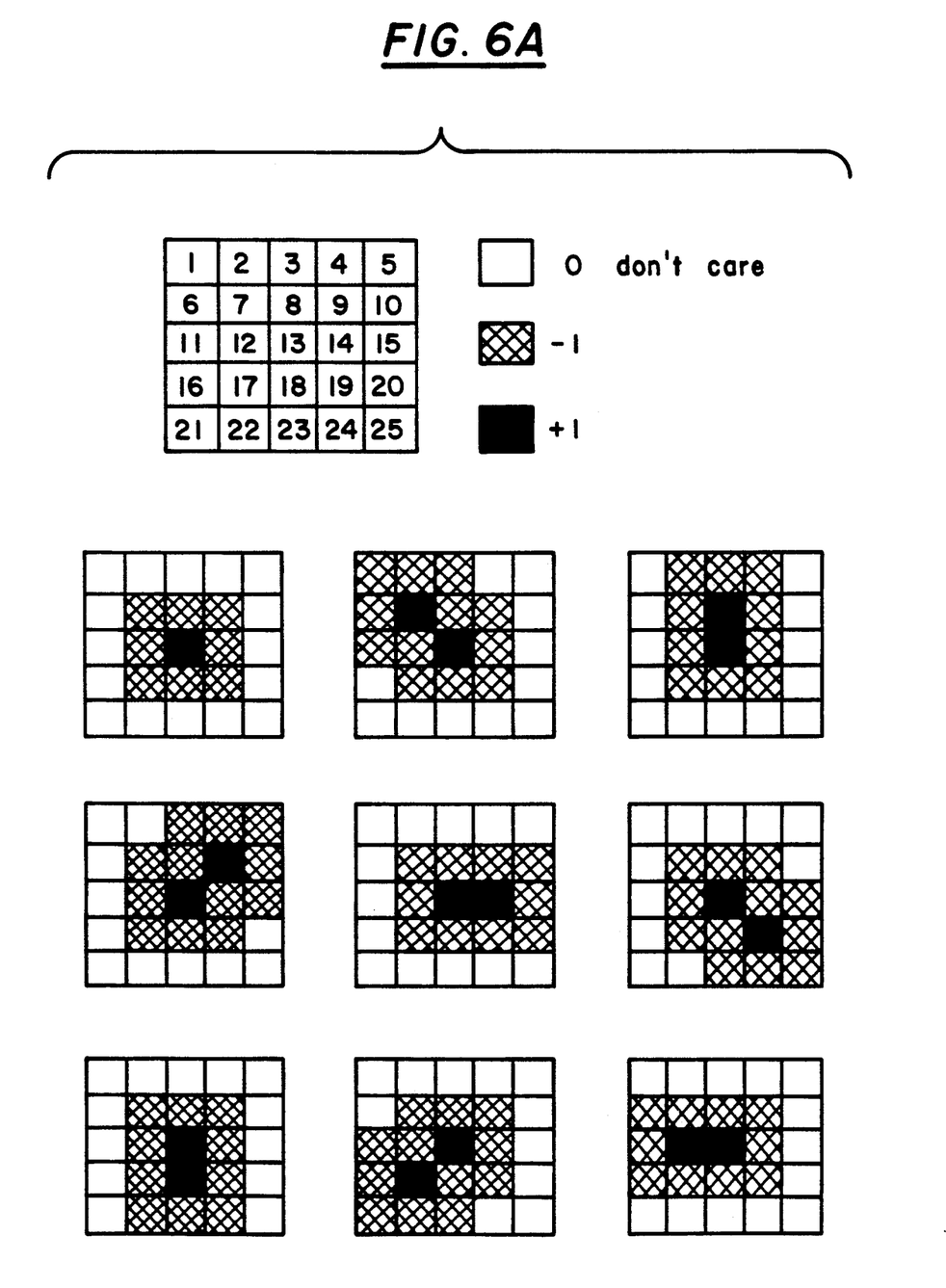
FIG. 6A is a mask pattern diagram for noise elimination in the character recognition.

FIG. 6A shows the noise eliminating masks employed in the noise eliminating circuit 105. The nine 5×5 mask patterns treat as noise the isolation point set by one pixel and the isolation points set by two connected pixels. Then as mentioned above, noise elimination is achieved by changing the central pixel from a "1" to a "0" or vice versa.

Figure 6B:
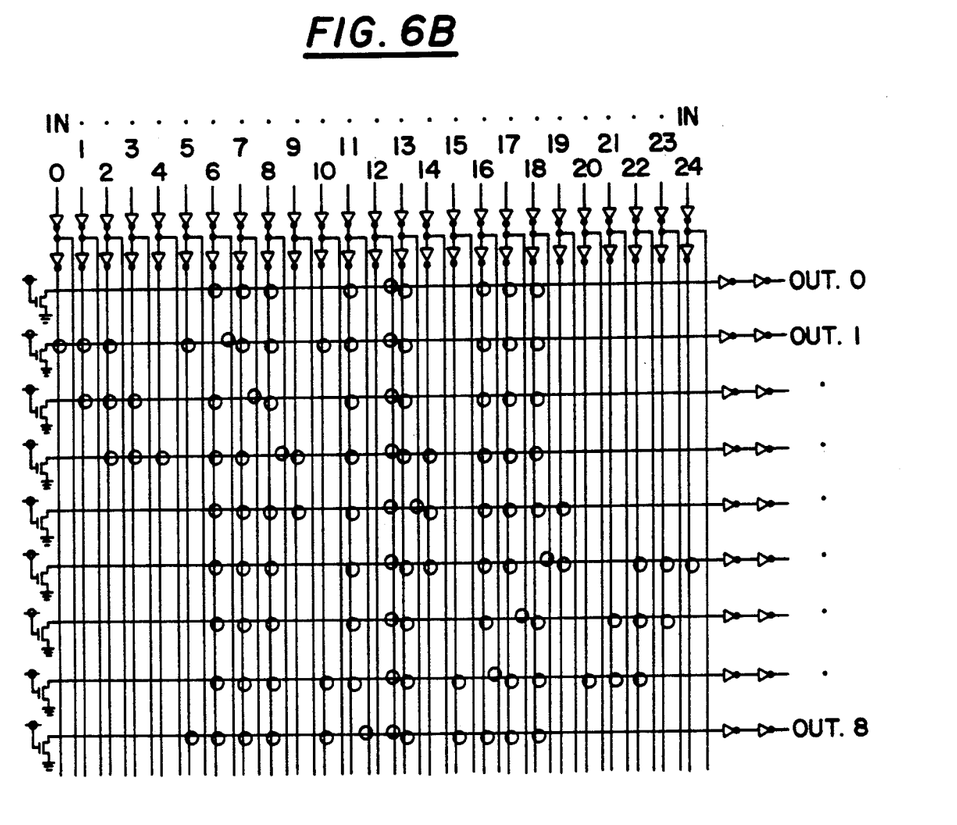
FIGS. 6B-6D are circuit diagrams of the pattern classifier in the present invention.
Figure 6C:
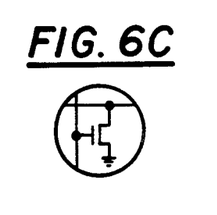
Figure 6D:
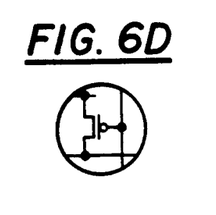

FIG. 6B shows the noise eliminating circuit 105 in the neural network configuration discussed above with respect to FIGS. 3A and 3B. The circuit comprises 25 input buffers amplifiers to receive corresponding inputs IN0 to IN24 and 9 output buffer amplifiers. Twenty-five input buffer amplifiers are required because each of the nine noise eliminating masks shown in FIG. 6A have twenty-five pixel locations. Nine output buffer amplifiers are required because there are a total of nine noise eliminating masks. Accordingly, the intersections of the input lines of the output buffer amplifiers and the output lines of the input buffer amplifiers, and the weights selectively applied to the intersections (i.e., an intersection with a PMOS transistor has a weight of $+1$, an intersection with an NMOS transistor has a weight of $-1$, and an intersection left unconnected has a weight of 0), define the noise eliminating mask patterns shown in FIG. 6A.

FIG. 7A shows 16 line thinning masks for the northern direction employed in the thinning circuit 106.

Figures 7B, 7C, 7D:
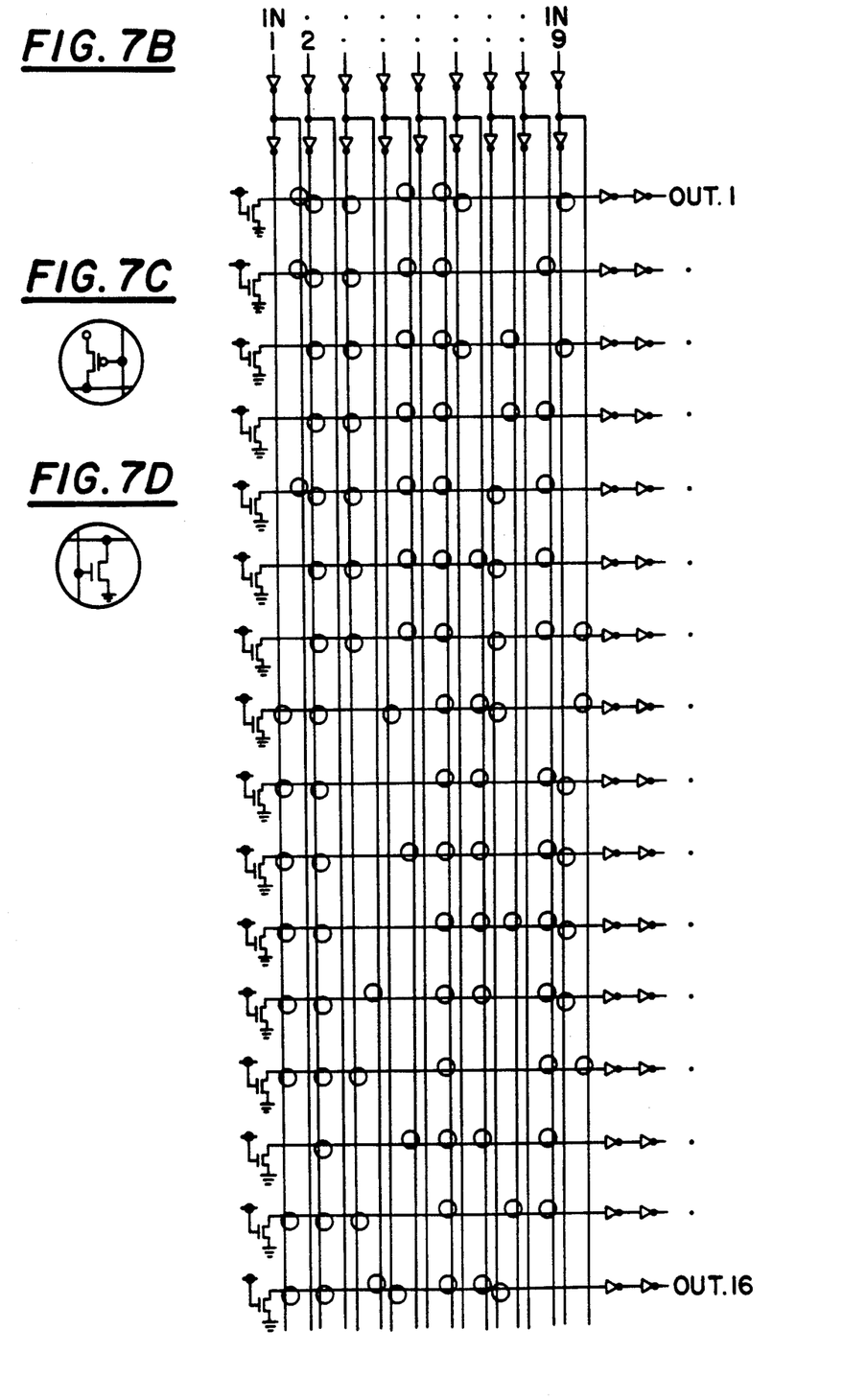
FIGS. 7B-7D are circuit diagrams of the pattern classifier in the present invention.

FIG. 7B is a circuit diagram of the line thinning circuit 106, proposed by Rosenfeld, etc, which performs the thinning algorithm. This algorithm is performed by eliminating the 8-simple points for the border point of each direction which does not change the connection due to elimination. Assuming that the medium has the optimal information of the thick width line, an image connected only to one pixel is obtained by thinning repeatedly until there are no 8-simple points to eliminate.

The line thinning circuit of FIG. 7B is constructed according to the neural network principles discussed with respect to FIGS. 3A and 3B.

Figure 8A:
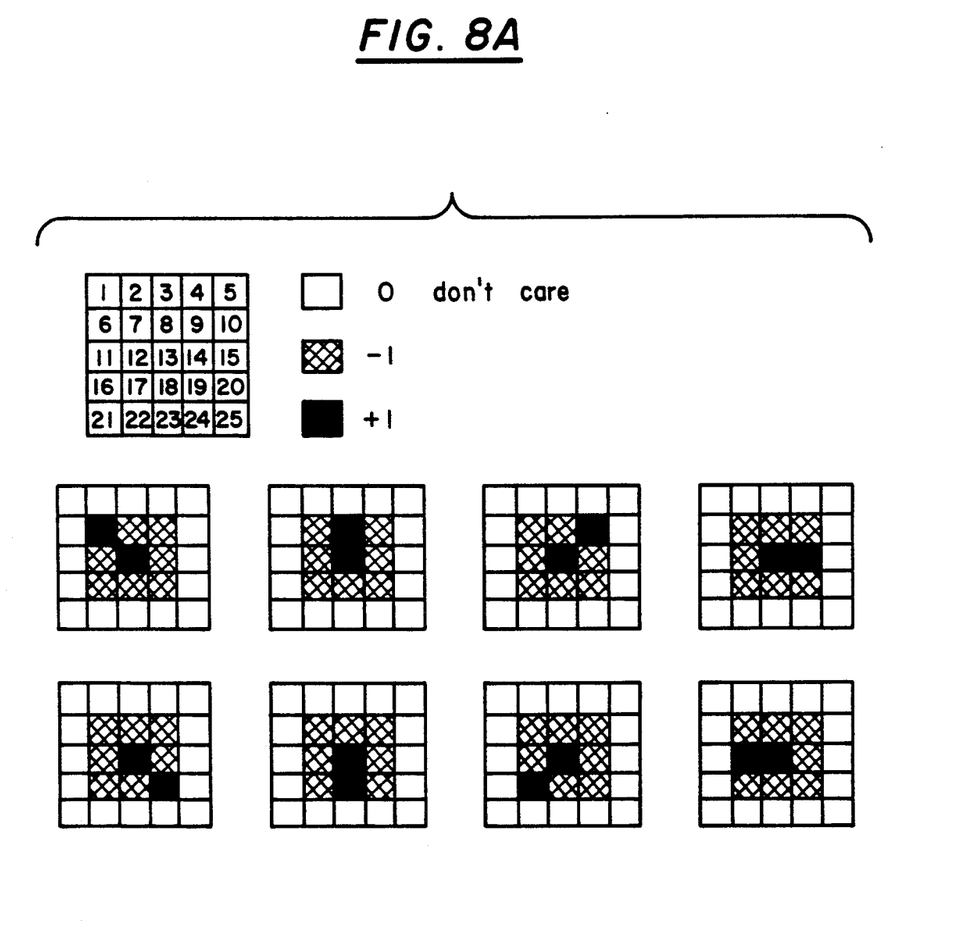
FIG. 8A is a mask pattern diagram for terminal point in the character recognition.
Figure 8B:
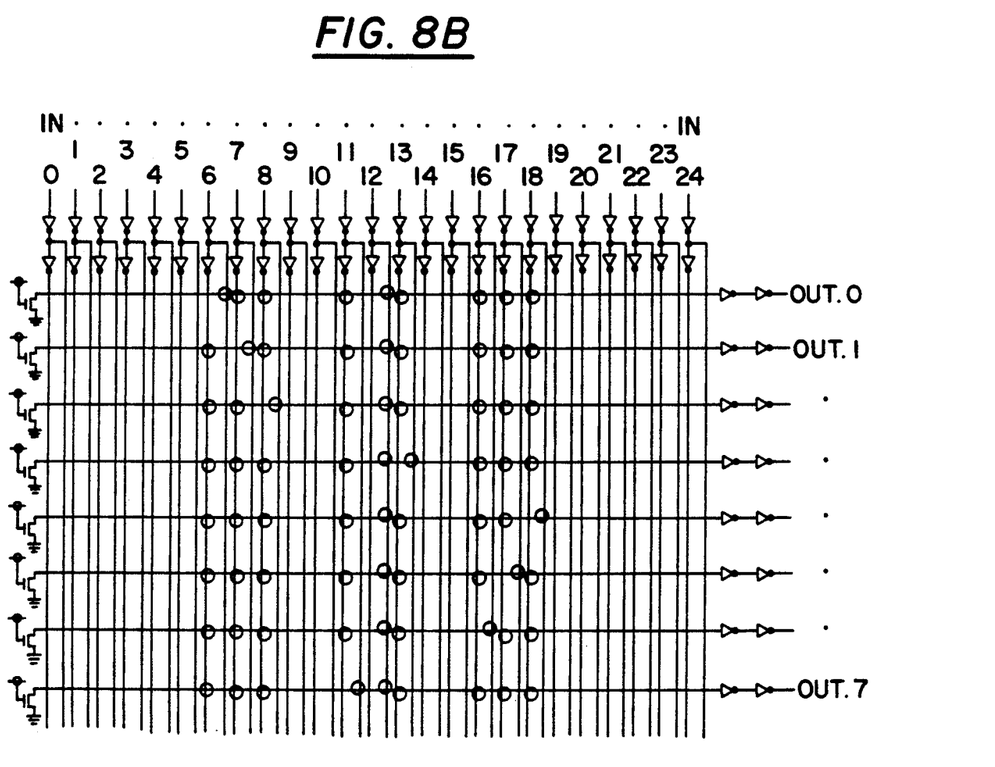
FIGS. 8B-8D are circuit diagrams of the pattern classifier in the present invention.
Figure 8C:
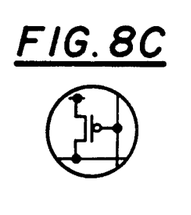
Figure 8D:
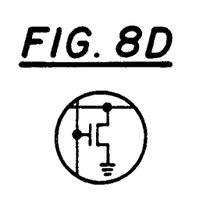
Figure 9A:
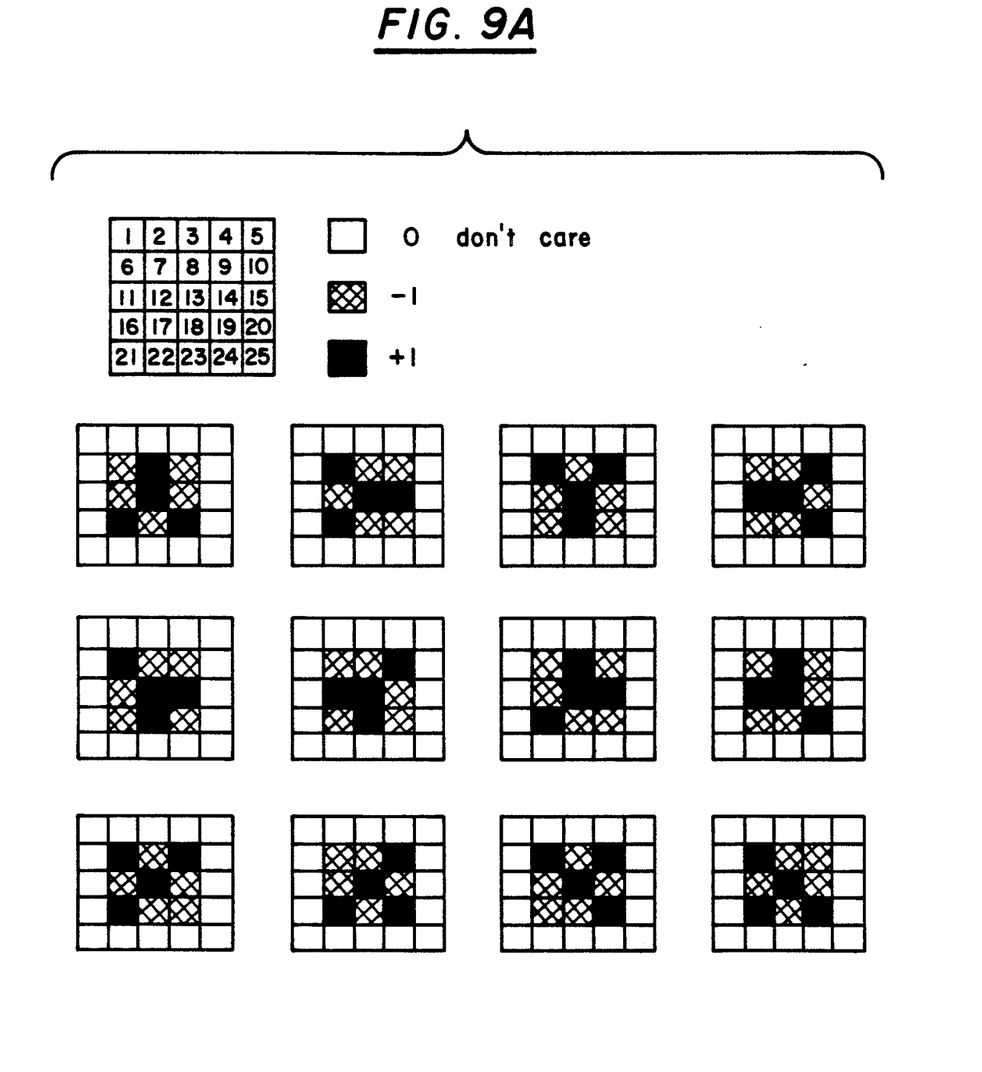
FIG. 9A ia a mask pattern diagram for branch point in the character recognition.
Figure 9B:
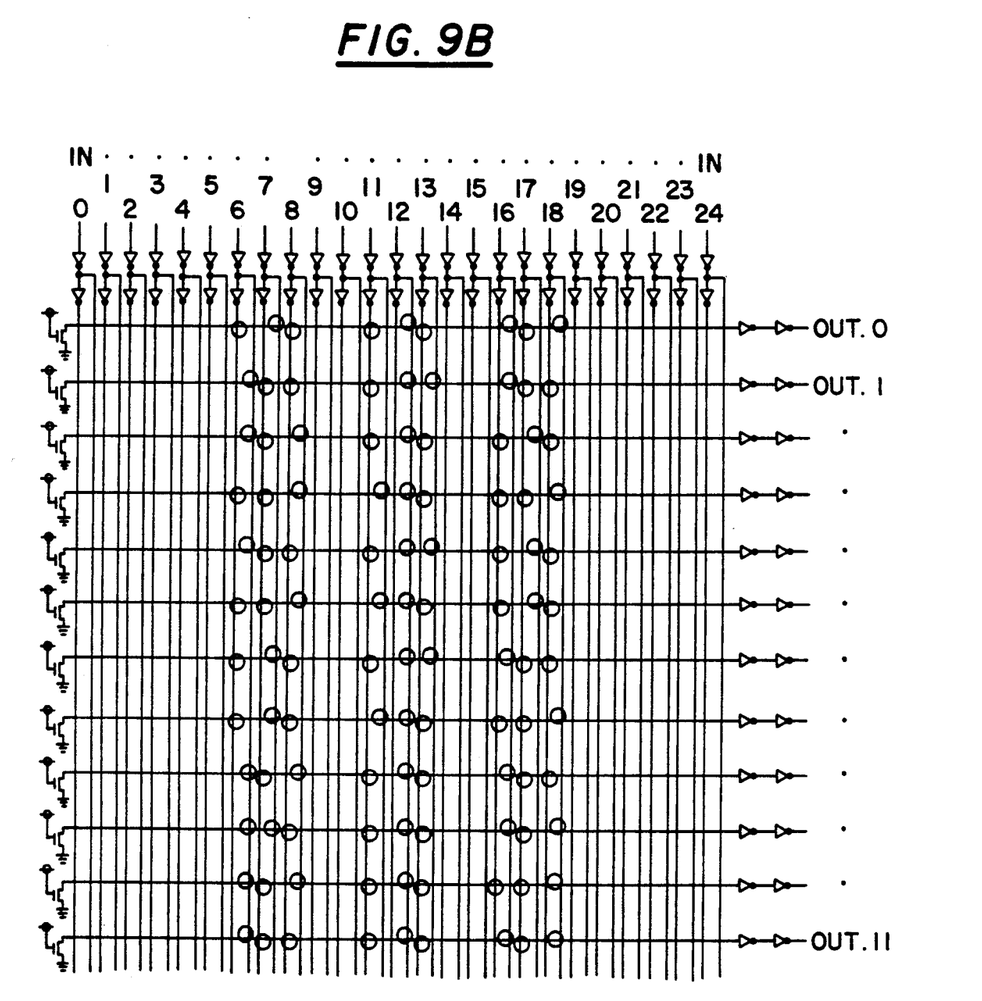
FIGS. 9B-9D are circuit diagrams of the pattern classifier in the present invention.
Figure 9C:
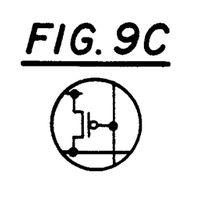
Figure 9D:
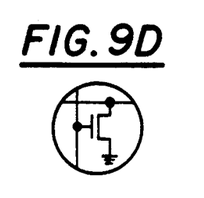
Figure 10A:
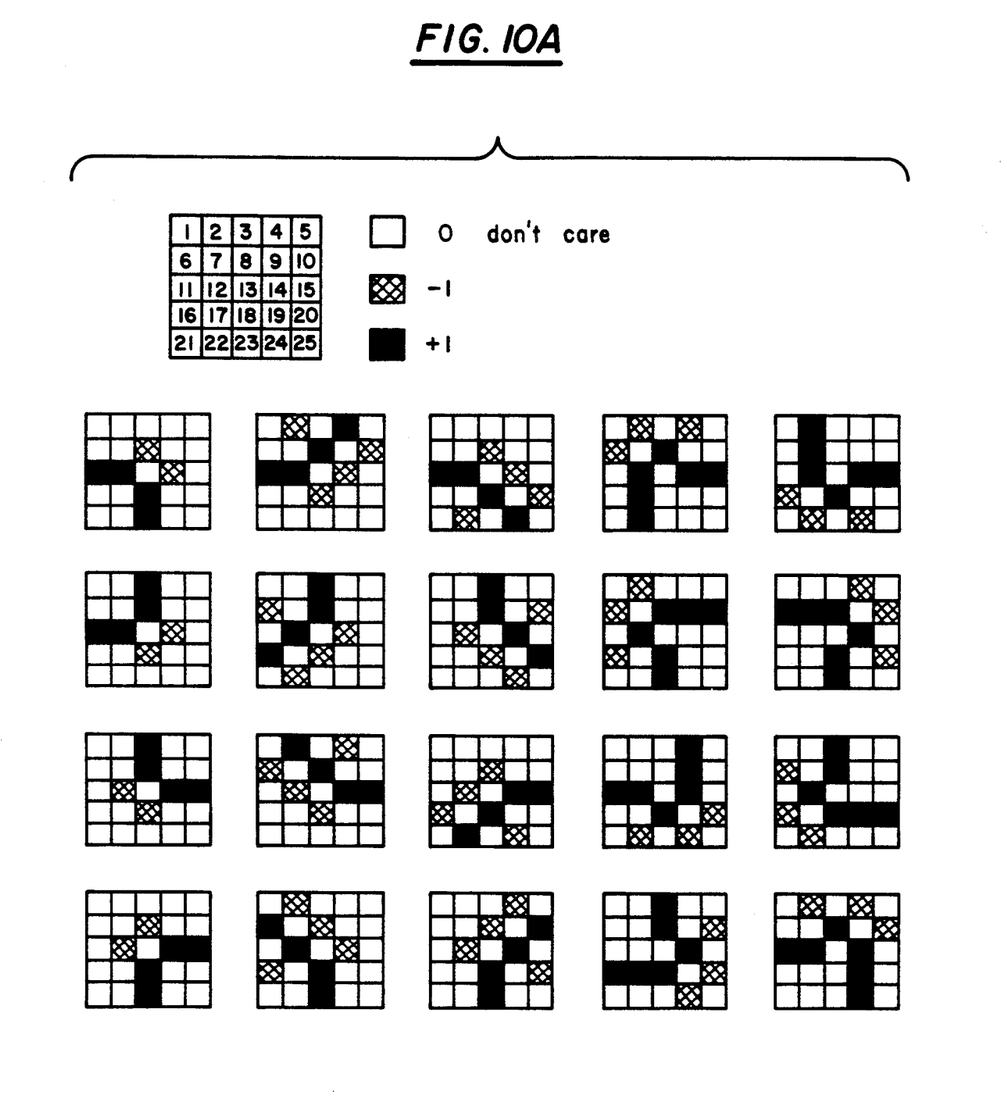
FIG. 10A is a mask pattern diagram for edge point in the character recognition and FIGS. 10B-10D are circuit diagrams of the pattern classifier in the present invention.
Figure 10B:
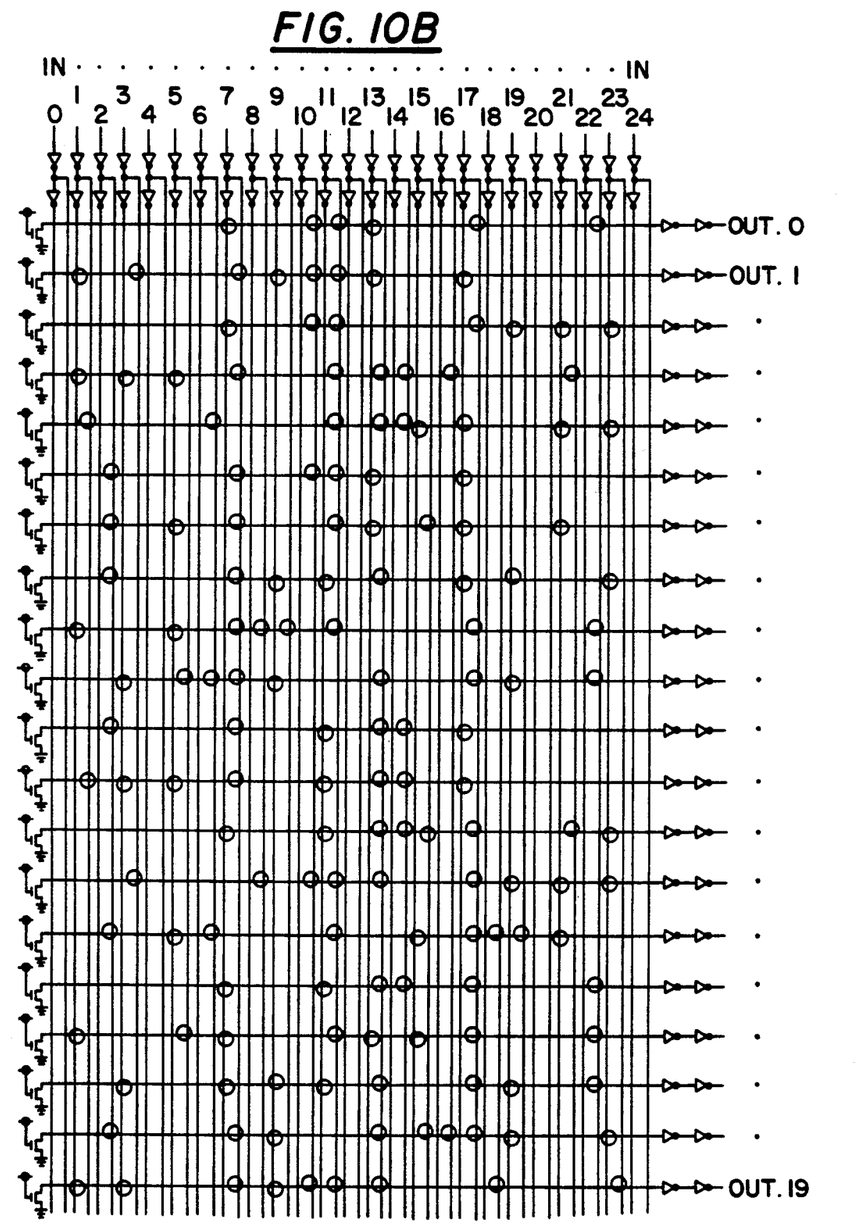
Figure 10C:
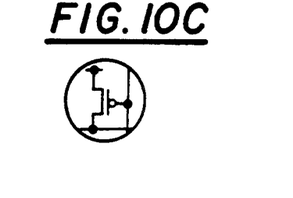
Figure 10D:
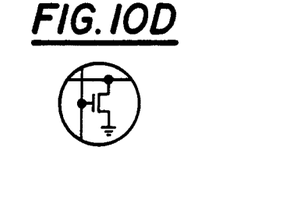

FIG. 8A to 10A show the feature point masks used to extract the feature points required for the character recognition of an input image thinned by the thinning circuit. FIG. 8A shows eight $5 \times 5$ masks for the terminal point detection, FIG. 9A shows twelve $5 \times 5$ masks for the branch point detection, and FIG. 10A shows twenty $5 \times 5$ masks for the edge point detection.

FIGS. 8B to 10B respectively show the terminal point detecting circuit, the branch point detecting circuit, and the edge point detecting circuit, all of which employ the neural network principles discussed with respect to FIGS. 3A and 3B.

The terminal point denotes the last point of each thinned character as represented by the "T" in FIG. 5C. As shown in FIG. 8A, the eight $5 \times 5$ masks have the center pixel and one of eight border pixels filled. The center pixel is detected lastly.

The branches point denotes the point mutually connecting different branches in a character image as represented by the "B" in FIG. 5C.

As shown in FIG. 9A, the twelve $5 \times 5$ masks have the central pixel and three of eight border pixels filled. This central pixel is detected in the branch point.

The edge point denotes the pint in which the progressing direction of the branches changes in a character image as represented by the "E" in FIG. 5C. The edge point is detected by using twenty $5 \times 5$ masks of FIG. 10A.

It should be noted that $3 \times 3$ mask could be used to extract the terminal point and branch point. But, to extract all three feature points simultaneously with one scan and to adjust to a $5 \times 5$ edge point mask, a $5 \times 5$ mask is employed.

The circuits of FIGS. 8B-10B are constructed as a neural network, and when the input data include one of the three feature points, the output of the output buffer amplifier goes "High".

In order to distinguish the output, an unshown OR gate is connected to the part of the mask of each feature point, and therefore, a specific feature point for the input can be output.

As shown in the present invention, a more stable pattern classifier is provided by the embodiment of CMOS circuit using the neural network model of the single layer perceptron type which is superior to the pattern classifier using the prior neural network.

What is claimed is:

1. A pattern classifier in a character recognition system having m masks, each mask having a $(2n+1) \times (2n+1)$ pixel region, where $n = 1, 2, 3, \ldots$, said pixel region defining a character region, a background region, and a don't care region, said character region being different for each of said m masks, said pattern classifier comprising:

$(2n+1) \times (2n+1)$ input buffer amplifiers, each input buffer amplifier corresponding to a respective pixel location of a $(2n+1) \times (2n+1)$ pixel region and having an inverted output line, a non-inverted output line, and a buffer input line for inputting the value of a corresponding character pixel of a character pattern;

m output buffer amplifiers, each output buffer line having a mask input line, the mask input line defining one of said m masks and forming a synapse connection with each of said inverted and non-inverted output lines;

character pattern synapses selectively coupled to form a synapse connection between said inverted output lines of said input buffer amplifiers and said mask input lines of said output buffer amplifiers in accordance with said character regions of said respective masks, each of said character pattern synapses comprising a PMOS transistor having a source electrode coupled to a first power source voltage, a gate electrode coupled to one of said inverted output lines, and a drain electrode coupled to one of said mask input lines;

background pattern synapses selectively coupled to form a synapse connection between said non-inverted output lines of said input buffer amplifiers and said mask input lines of said output buffer amplifiers in accordance with said background regions of said masks, each of said background pattern synapses comprising an NMOS transistor having a source electrode coupled to a second power source voltage, a gate electrode coupled to one of said non-inverted output lines, and a drain electrode coupled to one of said input lines; and bias synapses for biasing said input lines such that said output buffer amplifiers output a predetermined logic level when a character pattern fed to the input buffer amplifiers is identical to one of said masks defined by a corresponding mask input line, each of said bias synapses comprising an NMOS transistor having a source electrode coupled to the second power source, and a gate electrode coupled to the first power source, and a drain electrode coupled to a corresponding one of said mask input lines.

2. A pattern classifier as claimed in claim 1, wherein each of said input buffer amplifiers comprises two serially connected CMOS converters, whereby said inverted output line is coupled to an output of one of said inverters and said non-inverted output line is coupled to an output of the other of said inverters.

3. A pattern classifier as claimed in claim 1, wherein each of said output buffer amplifiers comprises two serially connected CMOS inverters.

4. A pattern classifier as claimed in claim 1, wherein a geometrical aspect ratio W/L of a PMOS transistor of said character pattern synapse is 6 $\mu$m/2 $\mu$m with a conductance value of 1, a geometrical aspect ratio W/L of an NMOS transistor of the background pattern synapse is 2 $\mu$m/2 $\mu$m with a conductance value of 1, and a geometrical aspect ratio W/L of an NMOS transistor of the bias synapse is (2·N) $\mu$m/ 2 $\mu$m where N denotes the number of PMOS transistors connected to a corresponding one of said mask input lines of the output buffer amplifier.

* * * * *